United States Patent [19]
Baker et al.

[11] Patent Number: 5,570,366
[45] Date of Patent: Oct. 29, 1996

[54] BROADCAST/MULTICAST FILTERING BY THE BRIDGE-BASED ACCESS POINT

[75] Inventors: Murray C. Baker, Toronto; Roger Y. M. Cheung, Scarborough, both of Canada; Partha P. Bhattacharya, Briarcliff, N.Y.; Roberto M. Kobo; Eduardo M. Kolbe, both of Campinas, Brazil; Mahmoud Naghshineh, Fishkill, N.Y.

[73] Assignee: International Business Machines Corporation, Armonk, N.Y.

[21] Appl. No.: 443,793

[22] Filed: May 18, 1995

[30] Foreign Application Priority Data

Dec. 8, 1994 [CA] Canada .................................... 2137587

[51] Int. Cl.$^6$ ...................................................... H04J 3/02
[52] U.S. Cl. ...................................... 370/85.13; 370/94.1
[58] Field of Search .............................. 370/85.13, 85.14, 370/85.15, 85.5, 85.7, 85.8, 85.2, 85.3, 85.4, 95.1, 95.2, 95.3, 92, 93, 100.1, 105.1, 110.1, 118, 60, 60.1, 94.1, 94.2, 94.3, 61, 13, 17, 54, 18; 455/3.2, 5.1, 11.1, 15, 53.1, 54.1, 54.2, 56.1, 55.1, 33.2, 58.2, 66, 78, 38.2, 38.3; 348/6, 7, 12; 375/240, 224, 220, 212, 213, 207, 208, 293, 356; 379/58, 60, 63; 340/825.02, 825.05, 825.07, 825.08, 825.15, 825.21, 825.52, 825.47

[56] References Cited

U.S. PATENT DOCUMENTS

| Re. 28,811 | 5/1976 | Pierce | 370/85.4 |
|---|---|---|---|
| 4,049,906 | 9/1977 | Hafner et al. | 370/61 |
| 4,081,612 | 3/1978 | Hafner | 370/60 |
| 5,159,592 | 10/1992 | Perkins | 370/85.13 |
| 5,276,703 | 1/1994 | Budin et al. | 370/93 |
| 5,339,316 | 8/1994 | Diepstraten | 370/85.13 |

OTHER PUBLICATIONS

"Extendability Considerations in the Design of the Distributed Computer System (DCS)", Farber et al., pp. 15E–1 to 15E–6.

*Primary Examiner*—Douglas W. Olms
*Assistant Examiner*—Dang Ton
*Attorney, Agent, or Firm*—Joscelyn G. Cockburn

[57] ABSTRACT

In communication systems which include high speed wired local area networks (LANs) and low speed wireless LANs, the bandwidth of the wireless LANs can be severely impacted. It has been found that many broadcast or multicast messages which are forwarded to the wireless LANs are not required as the mobile terminals which would receive the messages are not required to act on them. The present invention provides a means and method to filter out unneeded messages so that they do not impact the bandwidth of the wireless network. Each access point for each wireless LAN maintains a table of parameters for each associated mobile terminal in the connected wireless LAN. The parameters in that table are compared to the parameters in message frames received by the access point and only those messages having parameters found in the table are put on the wireless LAN. The level of filtering can be controlled by specifying which parameters are to be used for filtering messages. The tables at each access point are maintained current by moving table entries from access point to access point as mobile terminals move from wireless LAN to wireless LAN and by removing inactive table entries from the table when a predetermined interval of inactivity is encountered and a terminal is determined to be no longer in active contact with the access point.

12 Claims, 8 Drawing Sheets

| MOBILE'S MAC ADD. | MOBILE'S IP ADD. | MOBILE'S NETBIOS NAME | MOBILE'S IPX NETID |
|---|---|---|---|
| A1 | A2 | A3 | A4 |
| B1 | B2 | B3 | B4 |
| ⋮ | ⋮ | ⋮ | ⋮ |

→ TABLE ENTRY ASSOCIATED WITH MOBILE B

→ TABLE ENTRY ASSOCIATED WITH MOBILE A

BROADCAST/MULTICAST FILTERING BY THE BRIDGE-BASED ACCESS POINT

THE FIELD OF THE INVENTION

The present invention relates to communications systems in general and more particularly to communications systems that include both wired and wireless networks. The invention is particularly concerned with preventing the transmission of unused information frames on the wireless networks and is most useful in systems having mobile terminals in the wireless network.

INTRODUCTION

An access point is a device that connects a wired LAN (local area network) to a wireless LAN. Ethernet and token-ring networks are instances of wired LAN networks and infrared and radio networks are instances of wireless networks. An access point can be implemented as a bridge, a router, or a gateway. Most of the access points that exist today are implemented as bridges. The invention is described in association with a network that uses bridges, however, it is equally useful in networks using routers or gateways as will be readily apparent to those skilled in this communications technology.

A bridge-based access point connects two similar or dissimilar networks together via a medium access control (MAC) layer. The MAC data frames are forwarded from the wired network to the wireless network, and vice versa. The design of the particular access point dictates which data frames it will forward from one network to the other. For example, a transparent bridge-based access point forwards data frames based on the destination address of the data frame and the content of its filtering database. It is usually used to connect an ethernet network to a wireless network. A source routing bridge-based access point forwards data frames based on the routing information specified in the data frame. It is usually used to connect a token-ring network to a wireless network. In the case of broadcast or multicast data frames, the access point generally forwards all data frames it receives.

A broadcast data frame is a data frame that is intended to be received by all network nodes in the network. A multicast data frame is a data frame that is intended to be received by those network nodes in the network that belong to a particular group that the data frame has targeted. Not all of the broadcast or multicast data frames sent out on one network need to be sent to the other network. This is true when there is no network node in the receiving network which will act upon the forwarded data frames.

PRIOR ART

RE U.S. Pat. No. 28,811 issued May 11, 1976 to John Robinson Pierce is an example of a prior art multi-loop communication system. In the patent a plurality of independent rings are interconnected, by switching stations, to form a single network. Messages are conveyed between stations by standardized message blocks. Each message block includes one or more address fields located at the head or beginning of each block. The switching stations use the contents of the address field for switching the messages between rings. A difference criteria is used for switching the message. Essentially, the switching station detects a destination code which is carried in the address field. The detected destination code is then compared with the code for the loop on which the message block is currently circulating. If the codes are different, the message block is switched to another interconnecting loop. The process continues until a match is obtained. This technique does not ensure that the message is only processed by loops that have terminals that will act on the message.

U.S. Pat. No. 4,081,612 describes a technique for building up a routing address between stations interconnected by bearer channels and switching nodes.

U.S. Pat. No. 4,049,906 describes an apparatus for forwarding messages through the switching stations of a digital network with plural switching stations.

Other prior art techniques for routing messages in multi-ring networks are described by D. J. Farber and J. J. Vittal in an article entitled "Extendability Considerations in the Design of the Distributed Computer System (DCS)", Proceedings, National Telecommunications conference, November, 1973.

The drawback of the prior art is that there is no mechanism to control the distribution of messages of a broadcast nature where only a limited number of the receiving devices will respond to the message.

STATEMENT OF INVENTION

It is a purpose of the present invention to provide means to prevent transmission of frames to the wireless network that will not be responded to by a receiving terminal or terminals.

OBJECTS OF THE INVENTION

It is a general object of the present invention to provide an apparatus and method that ensures that messages are only transmitted to target stations in the communications network that will act on them.

It is a more particular object of the present invention to provide a method and apparatus to limit the transmission of messages to mobile terminals in a wireless network to only those messages upon which the terminal is required to act.

It is a further object of the present invention to provide a method and apparatus for controlling the level of filtering of messages to a wireless network.

It is a further object of the present invention to provide a method and apparatus for efficiently transferring filtering information concerning a mobile terminal from one access point to another when the mobile terminal moves from the network of the one access point to the network of the another access point.

DESCRIPTION OF THE DRAWINGS

FIG. 5 is a representation of a filtering table in an access point.

DESCRIPTION OF THE INVENTION

Figure 3:
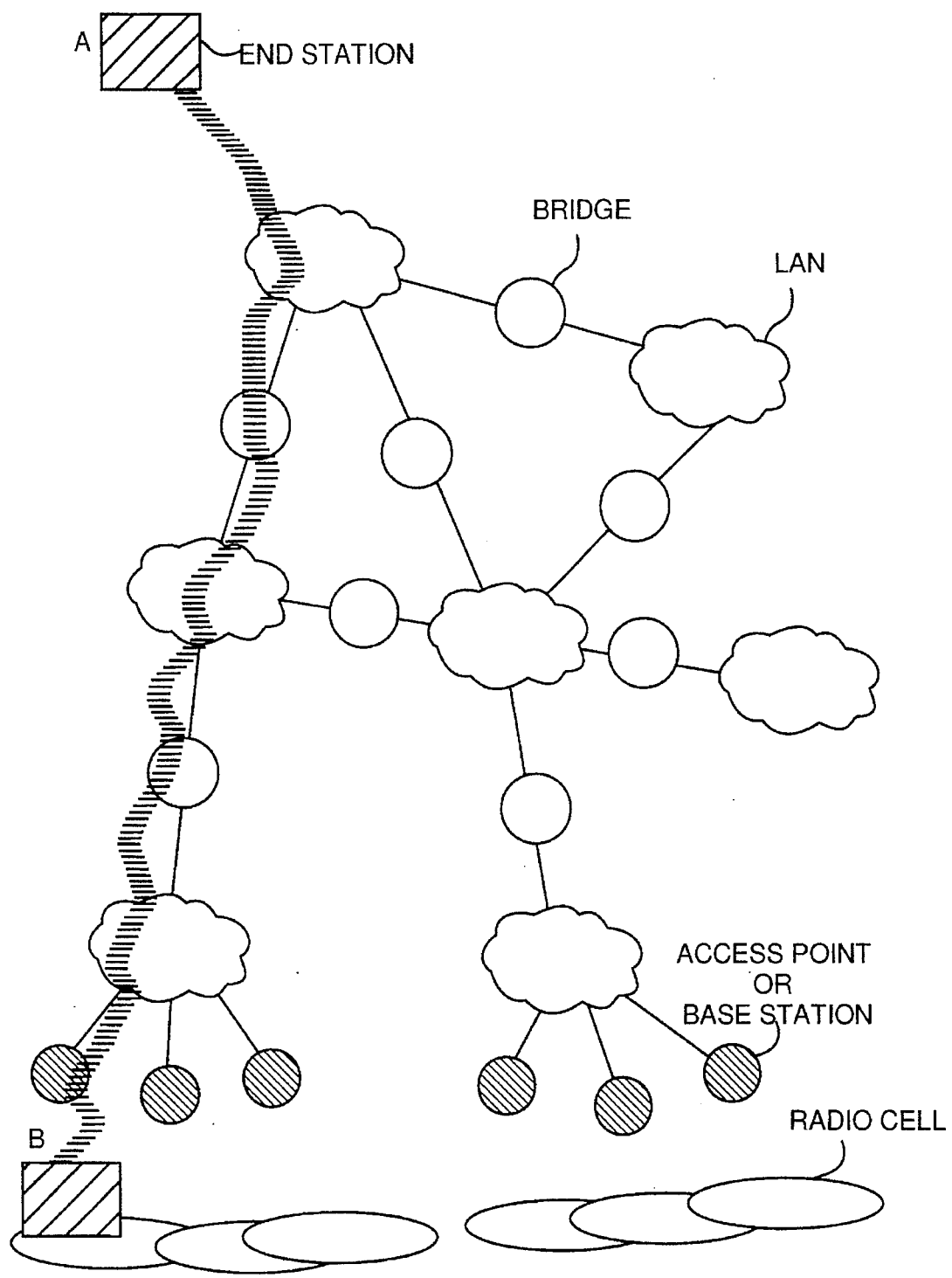
FIG. 3 is a schematic representation of a communications network illustrating the propagation of a directed packet through the network.

FIG. 3 illustrates a communication network including an end station A, a plurality of wired LAN's joined by bridges and a plurality of access point or base stations. Each access point communicates with a radio cell that includes one or more mobile terminals. As illustrated in FIG. 3, a directed packet is forwarded from station A, through three LAN networks, two bridges and an access point to a single mobile terminal B. This transmission requires no filtering since the message is cleanly intended for the single station B which would be expected to respond. As mentioned in some of the aforementioned prior art, the challenge in handling this type of communication is to ensure that the packet takes the most direct or efficient route from end station A to mobile station B or vice versa. The present invention is not directed to controlling the path of the transmission but is concerned with ensuring that broadcast or multicast packets are only transmitted to mobile stations on the wireless network that are required to act on them.

Figure 4:
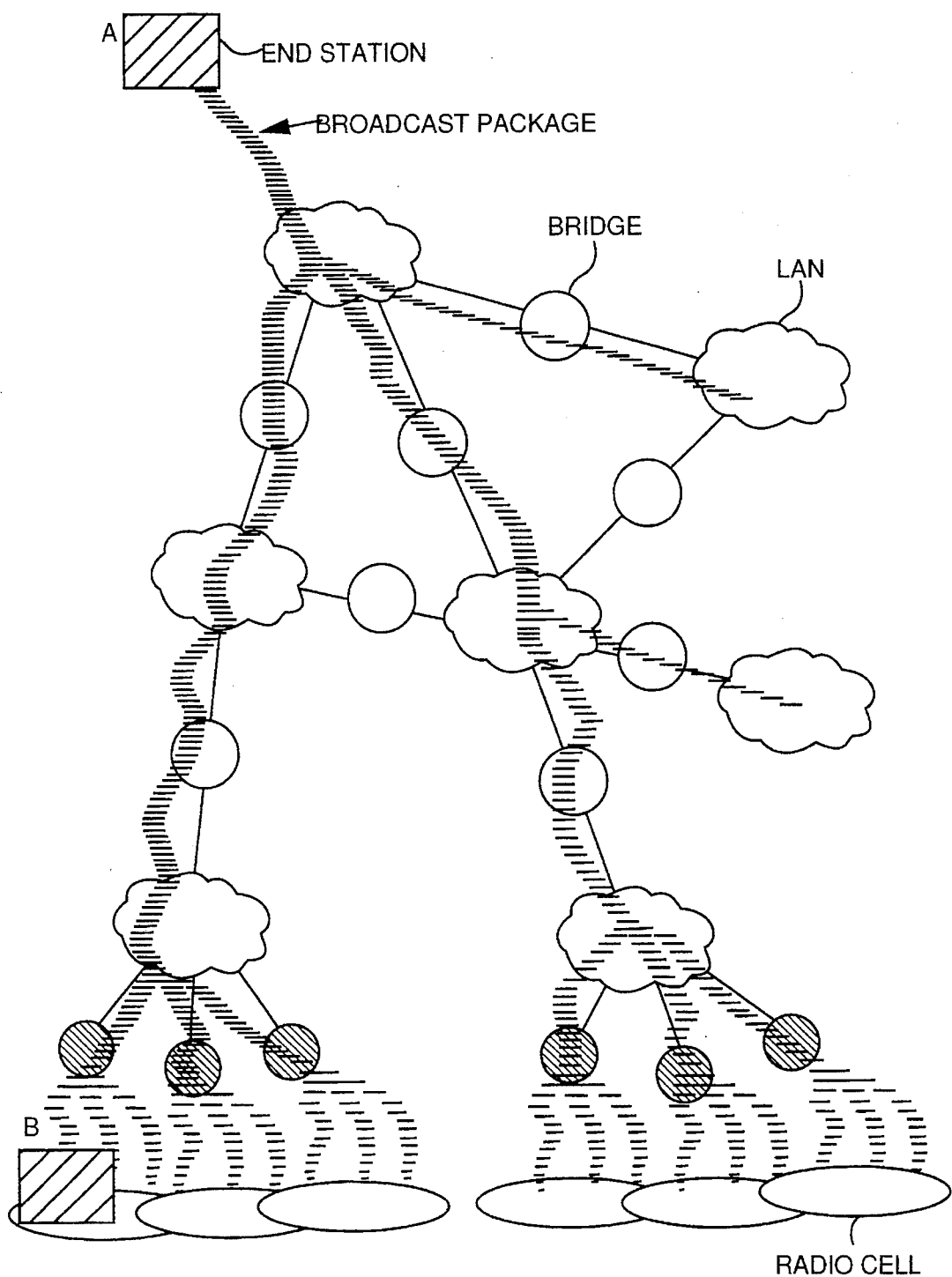
FIG. 4 is a schematic representation of a communications network illustrating the propagation of a broadcast packet through the network.

FIG. 4 illustrates the distribution of an unfiltered broadcast packet over the same communications network shown in FIG. 3. In this situation, the broadcast packet is sent to every LAN, over every bridge and, through every access point to every mobile terminal if there is no filtering action. This can be extremely wasteful of bandwidth in situations where the broadcast message is only intended for very few of the stations on the network. The present invention provides a mechanism for ensuring that these broadcast messages are not propagated through the network to stations which do not have to respond to them.

The purpose for providing a filtering function at the access point is to protect the scarce wireless bandwidth from heavy broadcast traffic on the wired Local Area Network (LAN). The amount of broadcast traffic in the wired network will depend on the size of the bridged network and the protocol type used for the transmission. As the size of the bridged network increases, the traffic increases and the number of frames per second increases.

These increases put added pressure on the very limited bandwidth of the wireless network. Protection of the wireless bandwidth is further complicated because the wireless network, to be useful, must be able to respond to messages in any or all of a plurality of differing communication protocols. The communications protocol type is determined by the user, management and network applications.

Figure 1:
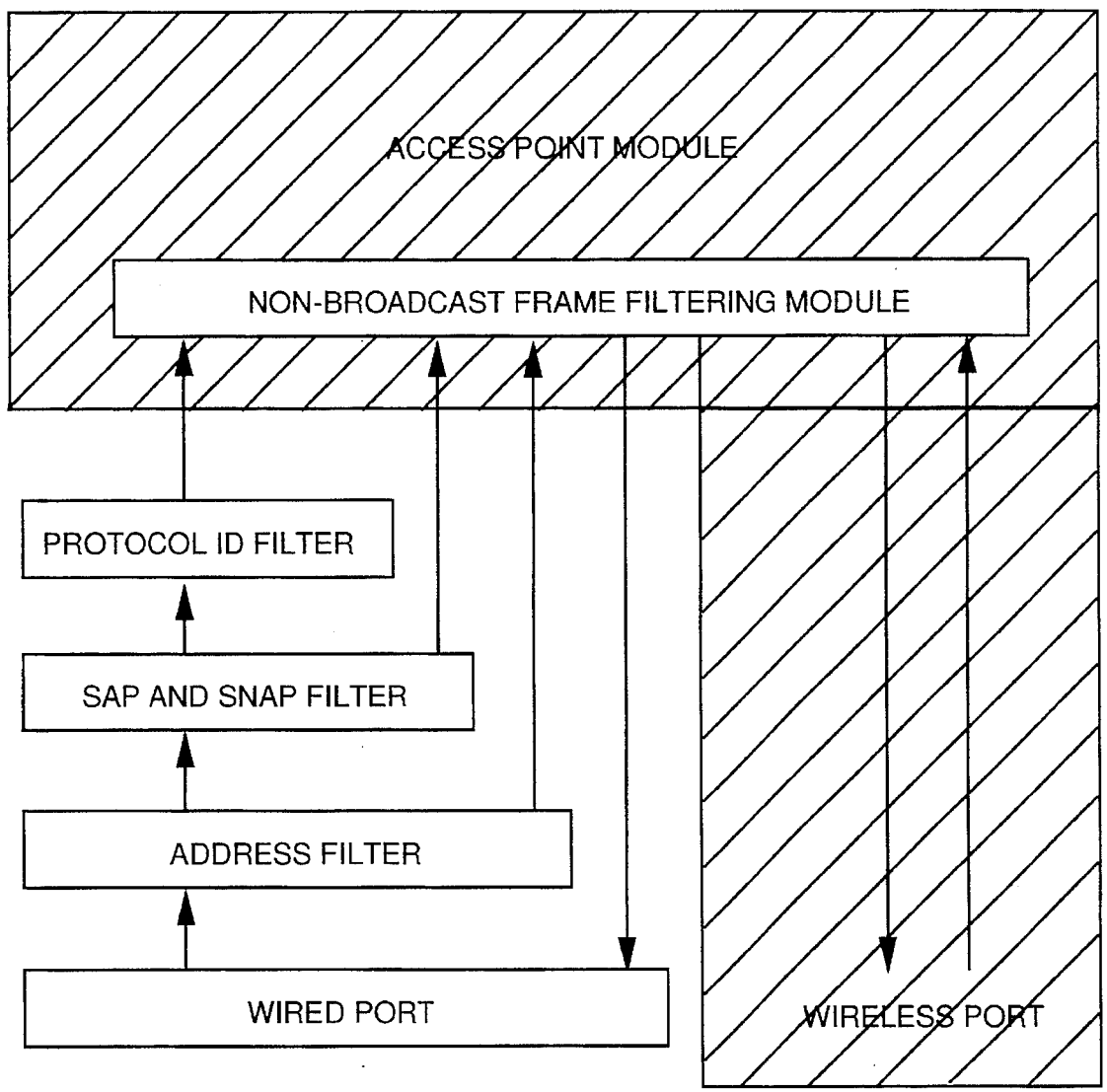
FIGS. 1 and 2 illustrate two methods of filtering the messages to minimize the impact on the bandwidth of the wireless LAN or other stressed communication network.
Figure 2:
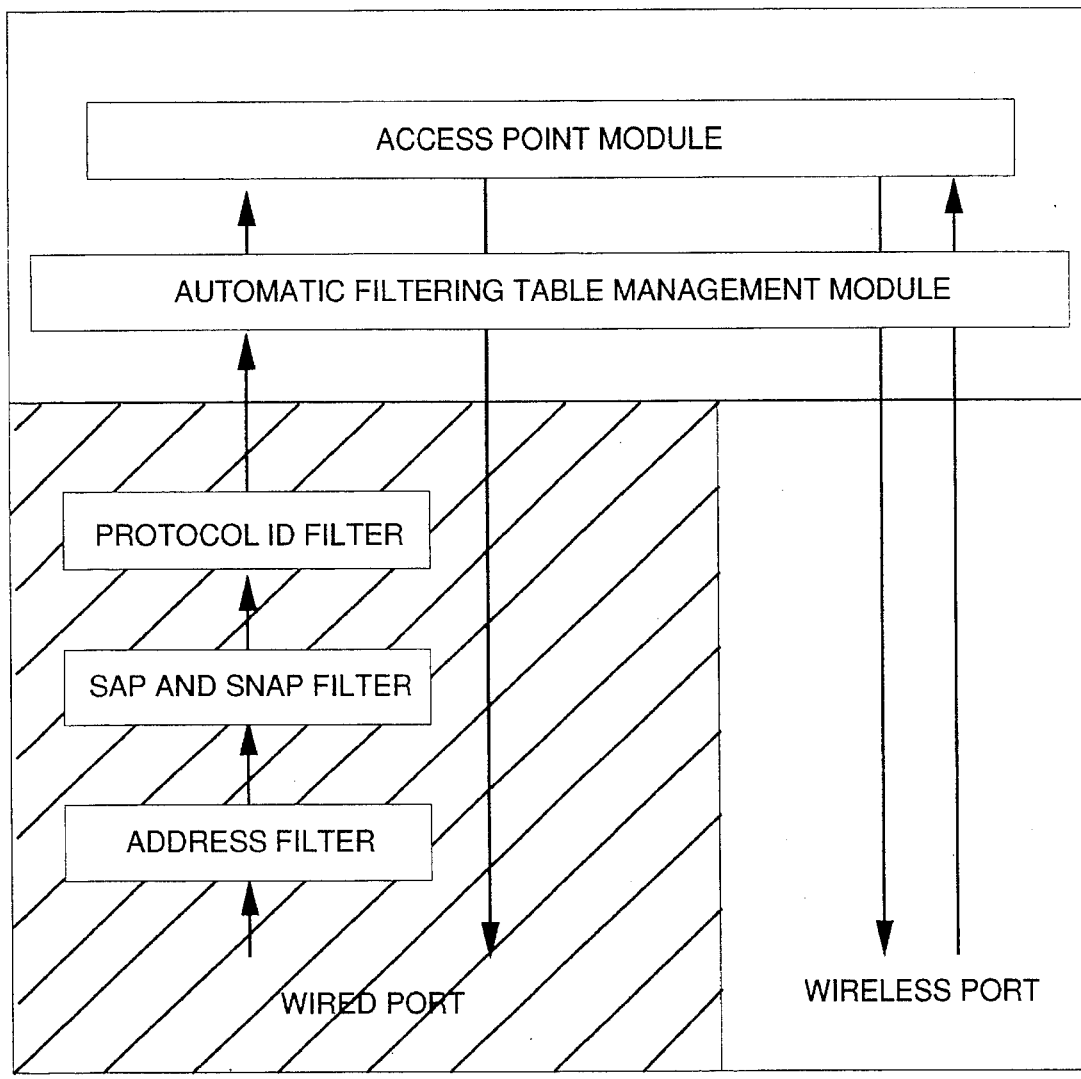

There are essentially three filtering parameters as shown in FIGS. 1 and 2. Address parameters are used to filter source or destination addresses. The service access point or sub-network access point parameters are used to filter in accordance with the system protocol. The Protocol ID filter uses the network address as a parameter.

Figure 6:
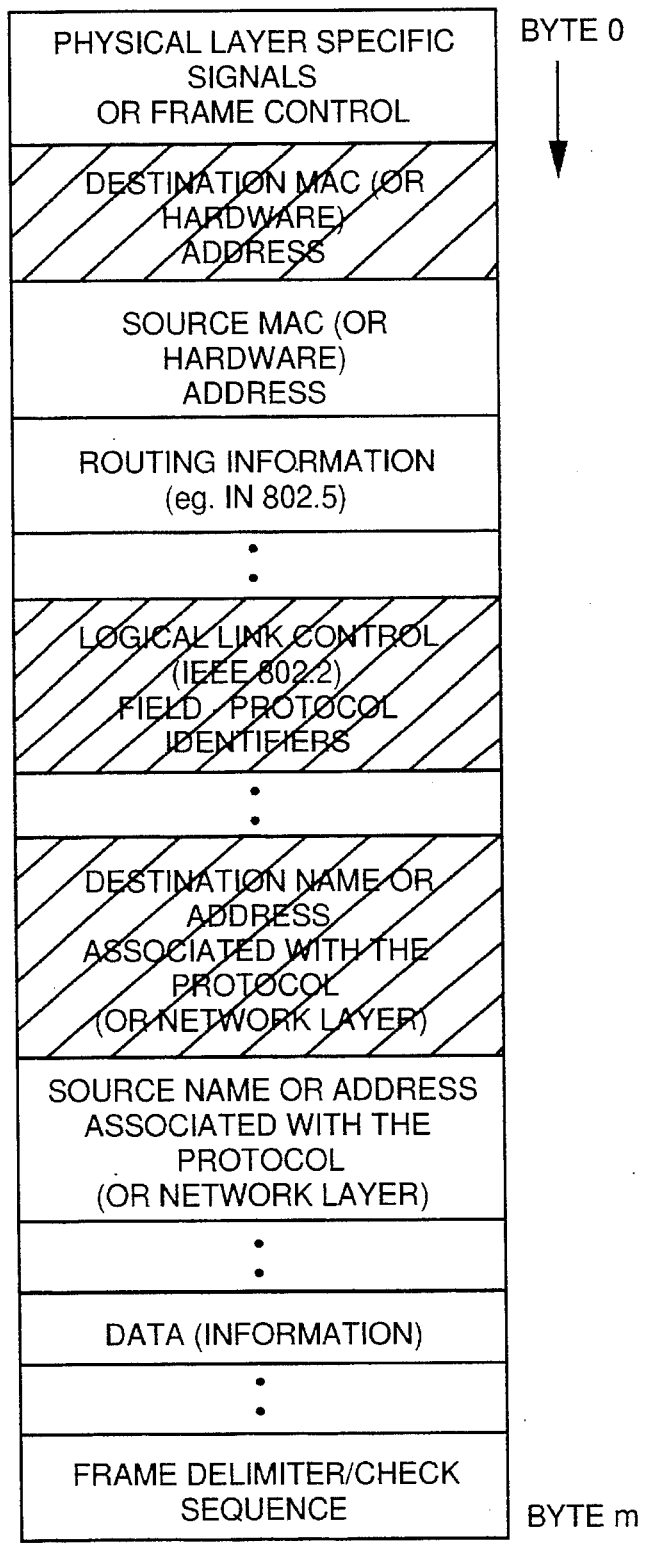
FIG. 6 is a representation of the frame format.

FIG. 6 shows different fields of a frame which can be received by the access point from the wired LAN. The order and combination of these fields vary based on the LAN type (802.5, 802.3, Ethernet, etc.) and protocol type (IP, NetBios, etc.). The important fields which are important to the broadcast filtering module are shaded. These are the destination Hardware (or MAC) address field, the protocol identifier field, and the protocol name or protocol address of the destination station.

A final level of filtering can be implemented using the network protocol address or ID. The filtering would be based on a number of common characters in the network frames. The characters would define parameters that are protocol dependent so that only those frames from a specified protocol would be given access to the wireless network.

The frame format is illustrated in FIG. 6. Each packet of information communicated on the network is packaged into a frame which includes all required identifier information as well as the data to be communicated. As shown in FIG. 6, a first group of bytes provides frame control information. A second group of bytes specifies the MAC or hardware address to which the frame is sent. The next group of bytes provides, for instance, layer two routing information. For example, the Institute of Electrical and Electronics Engineers (IEEE) protocol 802.5 has particular routing requirements. The next group of bytes in the frame provides the protocol identifiers for the frame. For example, these frames might provide Logical Link Control (LLC) information. The next group of bytes define the destination name or address which is associated with the protocol or network layer defined for the message. The next group of bytes define the source and destination name or address associated with the protocol or network layer corresponding to the sending and receiving stations. The next group of bytes are the actual message or data from higher layers that the packet carries and the last byte identifies the end of the frame and includes a check sequence to enable verification of proper communication of the message.

Filtering of broadcast frames uses up some of the access point resources such as time, processing capacity and memory. It is important to limit the broadcast filtering overhead if the intensity of broadcast frames would not result in a severe degradation of the wireless channel efficiency. If the wireless bandwidth consumed by the broadcast frames is a small percentage of the total wireless link bandwidth and the bandwidth is not fully consumed by the wireless terminals, it is unreasonable to filter the broadcast frames. However, if the broadcast traffic in the wired network is so high that its unfiltered transmission to the wireless LAN would severely degrade the performance of the wireless network, a broadcast filtering mechanism needs to be enabled so that a large percentage of the wireless link remains available to the connected mobile terminals. The filtering mechanism must be capable of determining the condition of the network so that it can be activated only when required.

The broadcast filtering mechanism may also be scalable and programmable so that it can be responsive to many different requirements and operating conditions. The filtering mechanism may be tunable so that the wireless bandwidth is used optimally.

Figure 8:
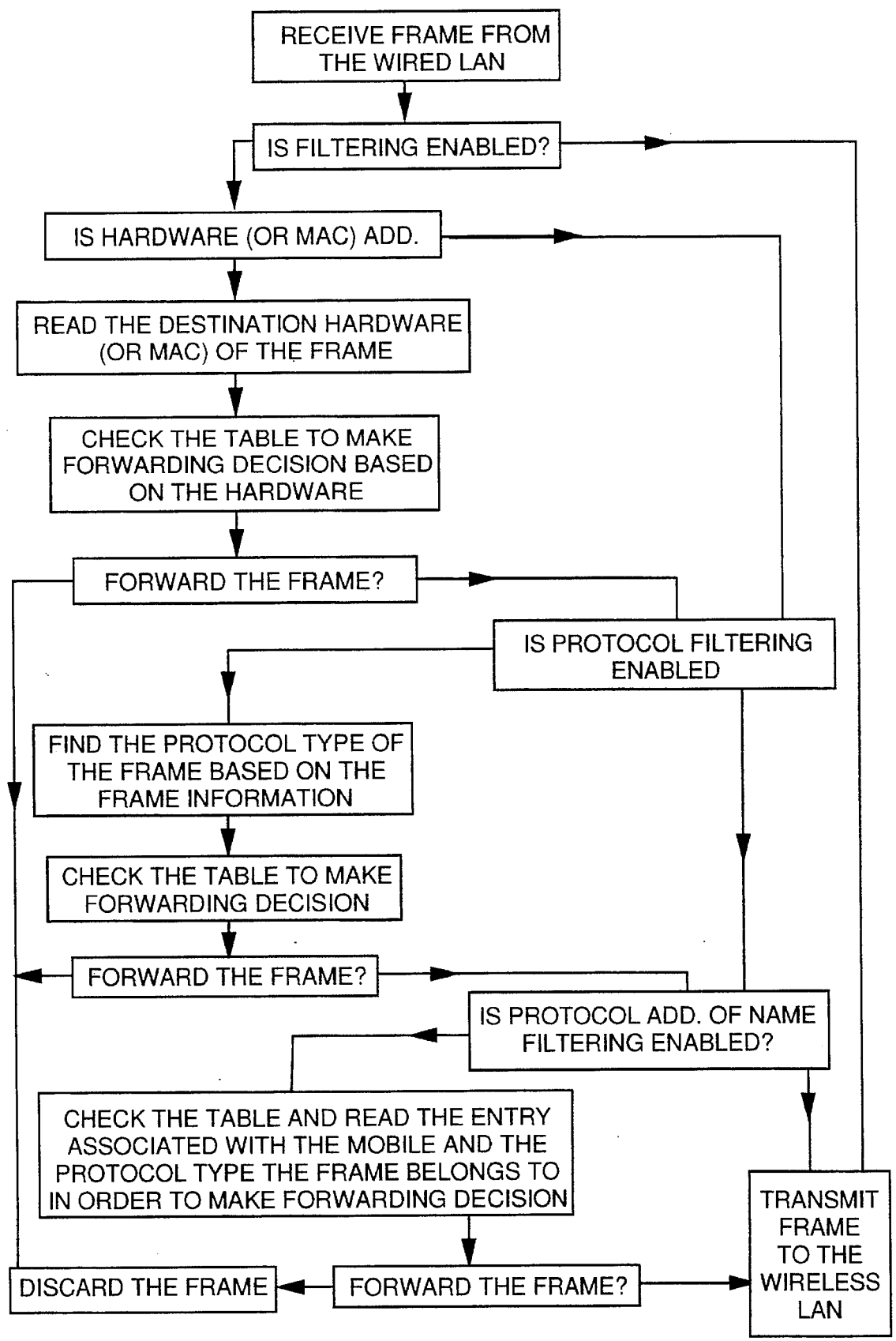
FIG. 8 illustrates the logical process for filtering frames received at an access point.

FIG. 8 shows the sequence of tests that can be done on a frame by the broadcast filtering mechanism in order to make a forwarding decision. Upon receiving a frame, the logic checks to see if the filtering is enabled. If the filtering is enabled, the logic checks to see what levels of filtering are enabled. The filtering can be done based on the hardware address, the protocol type and the protocol name or address. If any of these is enabled, the logic checks the table to see if the frame needs to be forwarded to the wireless LAN or to be discarded.

As shown in FIG. 8, the access point receives a frame from the wired LAN and, if the access point is conditioned not to filter incoming frames, it will forward the frame to the wireless LAN. However, if filtering is enabled, the degree of filtering is determined. First, the access point determines whether filtering is based on the MAC or hardware address.

If it is, the MAC or hardware address of the frame is read and compared to the MAC or hardware addresses stored in the table. If no match is found the frame is discarded. However, if a match is found, a test is made to determine whether the Protocol filtering is enabled. If Protocol filtering is enabled, the protocol type information in the frame is read and compared with the protocol type information stored in the access point table. If a match is not found the frame is again discarded. If a match is found, a test to determine whether the Protocol address or Name filtering is enabled is performed. If the Protocol address or Name filtering is not enabled at this point, the frame is passed to the wireless LAN. If the Protocol address filtering or Name filtering is enabled, the access point compares the protocol type to which the frame belongs to the entry associated with the mobile terminal to which the frame would be forwarded and, if there is a match, forwards the frame to the mobile terminal. If no match is found, the frame is discarded.

By selectively enabling and disabling the three filtering levels, the amount of filtering of frames passing between the wired network and the wireless network can be controlled and thereby provide an acceptable trade off between passing everything, which is acceptable when the wireless network is lightly loaded, and passing only those frames which will be acted upon by the receiving mobile terminal as is necessary when the wireless network is heavily loaded.

The present invention discloses a plurality of broadcast filtering mechanisms that can be used in the access point that connects the wired LAN to the wireless LAN, in a number of different combinations, to provide optimal broadcast filtering to optimize use of the wireless bandwidth available to mobile users of the wireless LAN.

The described filtering mechanism gains back bandwidth on the slow wireless network that would otherwise have been wasted on transmitting frames which would not find a response in the slow wireless network.

In situations where the two networks :are similar and their data rates are alike, forwarding the unneeded broadcast or multicast data frames is an acceptable solution. If, however, the two networks operate at very different speeds, the slow network can be overwhelmed with broadcast or multicast data frames from the fast network that it does not need to receive in the first place. One example is a token-ring network connected to an infrared network via an access point that works as a source routing bridge. The token-ring network may operate at up to 16 Mbps while the wireless infrared network may operate at only 1 Mbps. In this situation, unneeded broadcast or multicast data frames from the token-ring network could severely degrade the performance of the infrared network.

In our system, a filter is devised to look at packets of information on the wired LAN and determine whether the information is to be passed by the access point to the wireless LAN. The access point maintains a table of information which includes a record of all mobile terminals presently connected to the access point and the protocols such as TCP/IP, NetBios or IPX, which the mobile terminals may use.

FIG. 5 illustrates a table that can be used at each an access point for the purpose of broadcast filtering. Associated with :each Hardware or MAC address, as shown in FIG. 6, is a mobile terminal and all the names or addresses used for that mobile terminal in higher layer protocols are identified in a row. In the case that a hardware or MAC broadcast frame is received, the protocol name or address within the frame (as described in the Frame FIG. 6) is extracted and compared to see if that name or address exists in the filtering table. In addition to this table, one might have a table which identifies protocol types which need to be filtered regardless of the address or group functional addresses which need to be filtered in general.

The access point is designed to handle all the protocols used by the transmission system. The NetBios and TCP/IP protocols are used herein to illustrate the implementation of the present invention. However, the invention is equally useful with other protocols provided the rules of each protocol are preserved and obeyed. The implementation of the invention in association with other protocols Would readily be achieved by those skilled in the art.

Different protocols have differing characteristics. For example, the NetBios protocol tends to send more broadcast messages than the TCP/IP protocol. Also, the information needed to determine where a packet is going may be found in different fields in the different protocols. The access point must be able to respond to the different characteristics of the information packet of the different protocols so that it can forward or not forward the packet, as appropriate.

Many of the existing wired network bridges have already implemented some kind of broadcast/multicast filtering to protect the low bandwidth links, such as remote modem connections. However, the filtering design is based on the premise that network nodes on both networks connected by the bridge are stationery. This is not the case in a wireless and mobile network where the mobile network nodes move in and out of radio cells constantly. The normal bridge broadcast/multicast filtering design does not suffice in this environment. Our filtering system is particularly effective in protecting the bandwidth of wireless networks having mobile stations and maintaining the responsiveness of such wireless networks.

Mobile terminals can move from one access point to another. As they do so, the table information at each affected access point must be updated to reflect the status change. The old access point must remove the information from its table and the new access point must add the information to its table. This can be achieved either by transmitting table information directly between the access points or by communicating the changed status information directly from the moved mobile terminal.

A mobile network node has to be registered with the access point before it can be considered as part of the wireless LAN served by that access point. If the mobile network node moves to the vicinity of another :access point and registers itself with the other access point, that access point will inform the access point with which the mobile network node was registered previously to deregister the mobile network node. In this way, the access point is always aware of the mobile network nodes it is serving at any given time.

To ensure that inactive terminals are not maintained in the table, an aging algorithm is used to remove the information from the table after a terminal remains inactive for a predetermined period of time.

Not all lower communication layer MAC broadcast or multicast data frames are useful for a particular network node. Many MAC broadcast or multicast data frames are used to discover the location of a particular higher communication layer network address or network name. Even though all network nodes in the network receive the broadcast data frame or all network nodes that belong to a group in a network receive the multicast frame, only the network node with the target network address or network name needs to respond to the originator of the broadcast or multicast data frame. Other network nodes simply discard the frame.

To prevent unwanted broadcast or multicast data frames going from one network to another, and, in particular, from the fast wired LAN to the slow wireless LAN, the access point needs to know all the network layer addresses or network names of the mobile network nodes in the wireless LAN connected to the access point. The access point learns this information by observing the data frames originating from the mobile network nodes in the wireless LAN. With that information, the access point is ready to filter out any unneeded broadcast or multicast data frames. The access point processes all broadcast or multicast data frames originating from the fast wired LAN that are destined for the slow wireless LAN. It looks beyond the MAC layer information. It examines the rest of the data frame to see if the broadcast or multicast data frame can be used to discover a communication layer network address or network name. If so, the access point attempts to determine the target network address or network name and, if the target network address or network name matches one of the network addresses or network names that exist in the wireless LAN, the access point forwards the broadcast or multicast data frame. If no match is found, the frame is discarded.

The location and use of network addresses or network names within a broadcast or multicast data frame is determined by the communication protocol used by the frame. Accordingly, the access point must: create and maintain a separate broadcast/multicast filtering database for each communication protocol which will be used by broadcast or multicast data frames transmitted through the access point. The access point also needs to update the filtering databases whenever a mobile network node moves from one wireless LAN to another. The access point newly associated with the mobile network node may be helped by forwarding information in the filtering databases that is relevant to that mobile network node from the leaving access point. In this way, the new access point does not need to re-acquire the filtering information, and broadcast or multicast data frames destined for that mobile network node will be forwarded by the new access point. If the newly associated access point does not acquire the filtering information promptly, the mobile network node may not be able to receive some of those broadcast or multicast data frames. Furthermore, since some mobile network nodes may leave the wireless network or simply power down, an aging algorithm is used to decay inactive information out of the filtering database. This helps to preserve the resources at the access point as well as the bandwidth of the wireless LAN.

As an alternative, the mobile network node can acquire the filtering information itself and communicate the information to the access point. In this case, the access point does not need to examine the data frames originating in the wireless LAN to acquire the filtering information. In addition, the mobile network node, when registering with another access point, can pass the filtering information directly to the new access point instead of relying on the previous access point to send the information.

Figure 7:
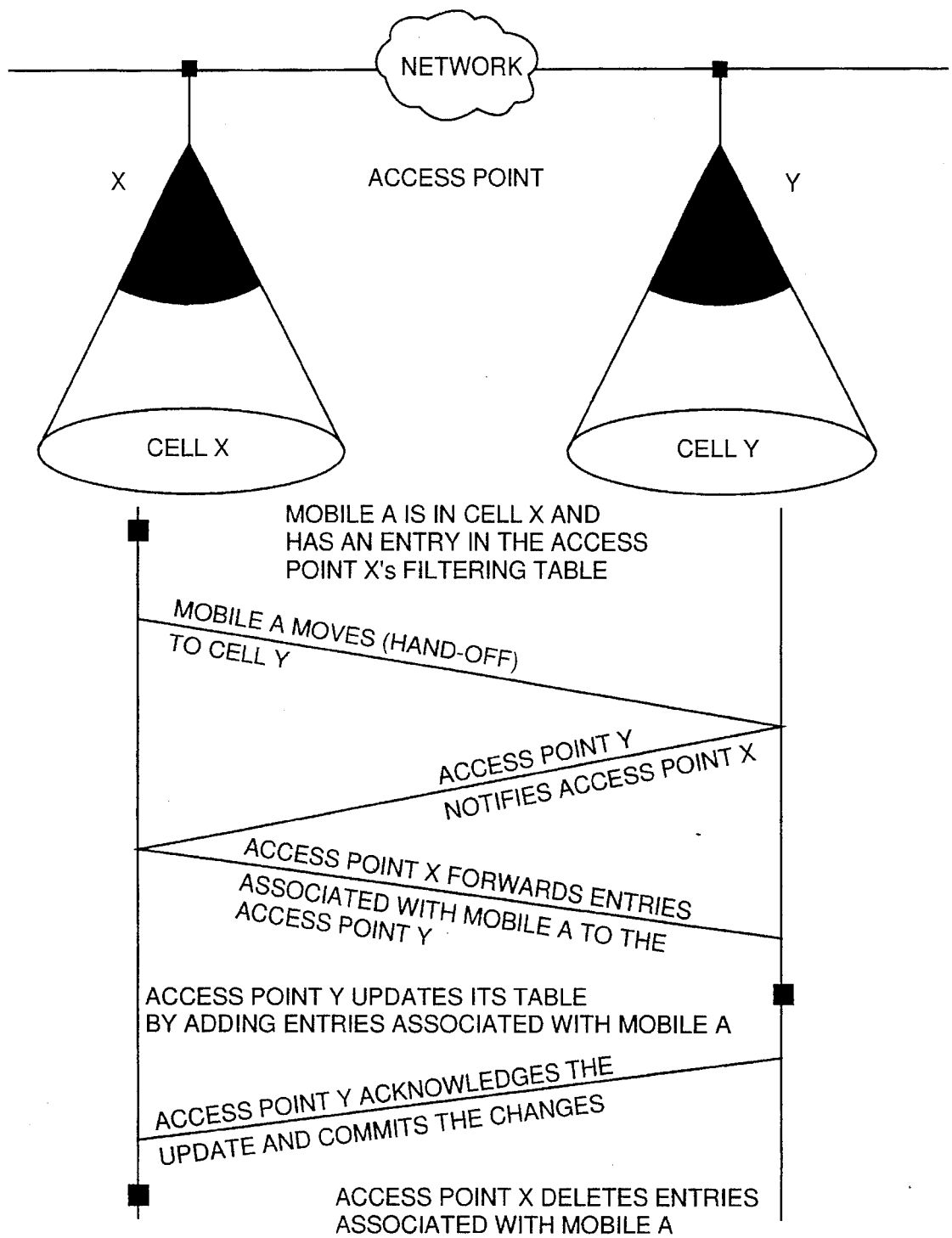
FIG. 7 illustrates the process for handing off a mobile terminal from one access point to another.

FIG. 7 shows one way in which table entries can be exchanged between access point tables when a mobile terminal moves from one network associated with a first access point to a second network associated with a second access point. In this example, a mobile terminal A is moving from cell X associated with access point X to cell Y associated with access point Y. Initially, terminal A has an entry in the filtering table held by access point X. As terminal A moves to cell Y, access point Y notifies access point X that it is now connected to mobile terminal A. In response, access point X forwards the entries in its filtering table associated with mobile terminal A to access point Y. Access point Y updates its filtering table to add the entries for mobile terminal A and informs access point X that access point Y has updated its table to include entries for mobile terminal A. Access point X is then able to delete the entries for mobile terminal A from its tables.

Lower communication layer MAC broadcast or multicast data frames originating in a particular protocol stack and intended for an upper communication layer in all network nodes within that protocol stack will be forwarded from the wired LAN to the wireless LAN without being filtered.

Filtering of broadcast frames is based on a number of parameters. It is important to use all of these parameters or a subset of them for filtering purposes. This provides a scalable filtering solution which optimizes the use of the access point resources.

Address filtering can be done for both broadcast and non-broadcast addresses. This feature enables control over wireless user's access to servers on the network.

Address filtering is the minimum broadcast filtering that an access point can perform. All broadcast frames that match a specific mask are filtered and blocked from being transferred to the wireless network from the wired network. Each communication protocol has a separate functional address associated with each type of broadcast. By masking certain functional addresses, communications of a certain type from a particular protocol can be blocked from accessing the wireless network.

The service access point (SAP) and sub-network service access point (SNAP) field in the broadcast packet identifies the protocol type and can be used to filter out broadcast packets generated by a specific protocol.

The following sections illustrate in particular how the solution can be applied to filter TCP/IP and NETBIOS protocol stacks data frames by a source routing bridge-based access point that connects a wired token-ring network to a wireless infrared network. This solution can be applied to any protocol stack. This solution is most useful for filtering out broadcast or multicast data frames from the fast wired LAN to the slow wireless LAN. However, if needed, the solution can be applied to filter data frames from the slow wireless LAN to the fast wired LAN.

The network address of the TCP/IP protocol stack is called the IP address. The broadcast/multicast filtering database maintained by the access point contains at least one field per entry: the IP address field. Other fields may be present but are not essential to the present invention. After initialization, the access point examines all frames originating from the slow infrared LAN to decide if it should pass them on to the fast token-ring LAN.

The access point must be able to determine if the current frame that it is examining is a IP data frame or address resolution protocol(ARP) data frame. ARP is the frame used by TCP/IP to discover a communication layer network address or network name as discussed previously. If it is an ARP data frame, the access point must then look inside the data frame and extract the source IP address. Once the access point determines the current frame from the infrared LAN contains a source IP address, it checks to see if that IP address already exists in the IP table. If the IP address does not exist, an entry for the new address is created in the IP table.

When a broadcast data frame comes in to the access point from the token-ring LAN, it would normally be forwarded by virtue of the fact that it is a broadcast data frame. However, the access point now checks to see if the broadcast data frame contains an IP data packet or an ARP packet. If the data frame contains such a packet, the access point examines the data field of the packet to determine if the destination IP address of the frame is in the IP table maintained by the access point. Only when the destination IP address exists within the IP table will the access point pass the broadcast frame from the token-ring LAN to the infrared LAN.

This enables the access point to effectively prevent IP broadcasts from the fast token-ring LAN from reaching the slow infrared LAN unless the access point knows that the destined IP address exists on the infrared LAN. The IP table does not have to be restricted to broadcast frames but can, in general, be used to filter all IP traffic. In this latter case, the access point behaves like a TCP/IP gateway.

Each IP table entry has an expiry counter associated with it. Whenever an access point receives an IP data packet or ARP packet from the wireless LAN that corresponds to an IP table entry, the expiry counter is reset to a predetermined timeout value. When the expiry counter reaches zero, after the predetermined timeout period, the IP table entry is deleted unless the mobile network node is still registered with the access point. If the node is still registered, the expiry counter is reset to the predetermined timeout value.

Those broadcast IP data packets having a destination IP address of all, are forwarded from the token-ring wired LAN to the infrared wireless LAN without being filtered. An IP address of all requires the packet to be received and processed by all network nodes with a TCP/IP protocol stack.

The second example of the solution deals with the NETBIOS protocol stack. Here, the access point maintains a broadcast/multicast filtering database, called NETBIOS table. The NETBIOS table must contain at: least one field per entry: a NETBIOS network name field. Other fields may also be present, but are not essential to this invention.

After initialization, the access point examines all frames originated from the slow infrared LAN to decide whether it needs to pass these frames on to the fast token-ring LAN. To maintain the NETBIOS table, the access point must also determine if the frame received from the infrared LAN is a multicast data frame that is destined for the NETBIOS functional address. Functional addresses are a subset of locally administered group addresses. If this is the case, then the access point needs to look inside the frame to determine the source NETBIOS network name. The access point will then check the NETBIOS network name table to see if an entry already exists for that NETBIOS network name. If the network name does not already exist in the NETBIOS table, a new entry is created.

When a multicast data frame is received from the fast token-ring LAN that is destined to the NETBIOS functional address, it would normally be forwarded by virtue of the fact that the frame is destined to a functional address. However, with this invention, the access point looks inside the frame to determine the destination NETBIOS network name. The access point then checks to see if that NETBIOS network name exists within the NETBIOS table. Only if the network name exists in the NETBIOS table will the NETBIOS frame be forwarded to the slow infrared LAN.

By following this procedure, the access point prevents multicast NETBIOS data frames from reaching the slow infrared LAN, except when it is determined that the destined NETBIOS network name exists on the infrared LAN.

If the access point is informed by another access point that the mobile network node has moved to its vicinity and registered With it, it will deregister the mobile network node and forward the entries in the NETBIOS table that are associated with the mobile network node to the access point with which it is newly registered. The deregistered access point will also delete those entries from its NETBIOS table.

Each NETBIOS table entry has an expiry counter associated with it. Whenever the access point receives a NETBIOS data packet from the wireless LAN that is addressed to the NETBIOS functional address, it checks to see if a corresponding NETBIOS table entry exists. If an entry exists, the expiry counter associated with that entry will be reset to a predetermined timeout value. When the expiry counter reaches zero, after the predetermined timeout period, the NETBIOS table entry will be deleted unless the mobile network node is still registered with the access point. In that case, the expiry counter will be reset to the predetermined timeout value.

For those broadcast, not multicast, NETBIOS data packets that are intended to be received and processed by all network nodes with NETBIOS protocol stack, they will be forwarded from the token-ring wired LAN to the infrared wireless LAN without being filtered.

Once a mobile terminal hands off to a new access point, its table entries must be transferred from the original access point to the new access point. Once a mobile hands over to a new access point, a frame is sent from the new access point to the old access point. This frame updates the route to the new access point. This frame carries the MAC address of the new access point on the wired side as well as the mobile terminals MAC address. Upon receiving the frame, the old access point sends entries corresponding to the mobile terminal MAC address to the new access point. Table update frames are acknowledged to the old access point. When acknowledgements are received, the old access point deletes the corresponding entries from its table.

One example of an implementation for automatically filtering NetBios broadcast frames could be constructed as follows:

```
if (Destination address= NetBios Functional Single Route
    Broadcast address)
then
  <
  if (  NetBios Type = ADD_GROUP_NAME_QUERY /* x'00' */
        OR NetBios Type = ADD_NAME_QUERY    ) /* x'01' */
     then
        <
        if (NetBios SOURCE_NAME matches any entry in the table)
           then
              forward the frame
           else
              discard tthe frame
        >
     else
        <
        if ( NetBios Type = NAME_IN_CONFLICT   /* .'02' */
             OR NetBios Type = STATUS_QUERY    /* x'03' */
             OR NetBios Type = DATAGRAM        /* x'08' */
             OR NetBios Type = NAME_QUERY      /* x'0A' * /
             OR NetBios Type = ADD_NAME_RESPONSE) /* x'0D' */
           then
              <
              if (NetBios DESTINATION_NAME matches any entry
                  in the table)
                 then
                    forward the frame
                 else
                    discard the frame
              >
           else
              forward the frame
```

```
>
else
    forward the frame
```

It is easy to see how the invention can be extended to other protocol stacks. In general, the access point needs to construct a separate filtering database per protocol stack on which it wishes to apply filtering. The database has a field that uniquely identifies a network node in the wireless network for which a broadcast or multicast data frame is actually intended.

When data frames are received from the slow wireless network, the access point examines the data frame to determine to which protocol stack it belongs. Then the access point checks the corresponding protocol stack's broadcast/multicast filtering database to determine if the unique entry for the source network node is already present. If the entry does not exist, the access point creates it.

When a broadcast or multicast data frame is received from the fast wired network, the access point examines the data frame to determine to which the protocol stack it belongs.

Depending upon the protocol, it finds the Name/Address associated with that protocol included in the frame, then it goes to the table to look for the Name/Address associated with the access point. Then the access point checks the corresponding protocol stack's broadcast/multicast filtering database. Only if the Name/Address was found in the protocol stack's database should the access point forward the frame to the slow wireless network.

If the access point is informed by another access point that the mobile network node has moved to its vicinity and registered with the other access point, the access point will deregister the mobile network node and forward the entries in the protocol stack's broadcast/multicast filtering database that are associated with the mobile network node to the access point with which the mobile terminal is newly registered. The deregistering access point will also delete those entries from the protocol stack's broadcast/multicast filtering database.

Each protocol stack's broadcast/multicast filtering database has an expiry counter associated with each entry in the database. Whenever the access point receives, from the wireless LAN, a broadcast or multicast data frame that belongs to the protocol stack, the access point checks to see if a corresponding entry exists in the protocol stack's broadcast multicast filtering database. If an entry exists, the expiry counter associated with that entry is reset to a predetermined timeout value. When the expiry counter reaches zero, after the predetermined timeout period, the filtering database entry will be deleted unless the mobile network node is still registered with the access point. In that case, the expiry counter is reset to the predetermined timeout value.

The embodiments of the invention in which an exclusive property or privilege is claimed are defined as follows:

1. In a communications system comprising a plurality of wired networks, a plurality of wireless networks and an access point between each wireless network and a wired network, each said access point controlling the transmission of messages between one of said wireless networks and one of said wired networks, wherein said access points control said transmission by performing the following steps:

creating a table in each said access point, said table including the identity of each node in its associated wireless network and predetermined communication parameters associated with each node on said associated wireless network;

comparing identity and communication parameter information associated with each message received by said access point with corresponding information in said table at said access point; and transmitting, to said associated wireless network, only those messages which will be responded to by a node on said associated wireless network as determined by comparing said identity and communications parameters in said received message to entries in said table.

2. In a communications network including at least one wired network and at least one wireless local area network LAN and at least one access point connecting the at least one wireless LAN to the at least one wired network, a device to control transmission of messages between said at least one wireless LAN and said at least one wired network so as to preserve bandwidth on said at least one wireless LAN, said device comprising:

means for storing a table of predetermined message parameters at the at least one access point;

means for comparing parameters in each message received from the at least one wired network connected to said at least one access point to said parameters stored in said table; and means for transmitting messages between said at least one wireless LAN and said at least one wired network when said parameters in said each message correspond to message parameters in said table in said at least one access point.

3. In the communications network as defined in claim 2 wherein said at least one wired network includes LANs.

4. In the communications network as defined in claim 2 or claim 3 wherein said communications network includes mobile terminals in said at least one wireless LAN and said predetermined parameters define destination addresses, protocol identifiers and destination names associated with each protocol for each mobile terminal associated with said at least one access point.

5. The communication network system as defined in claim 4 further including means to selectively compare said parameters in said message to said parameters in said table so that a preferred level of filtering of said messages can be selected.

6. The communication network as defined in claim 4 and further including means for transferring table entry information from one access point to a second access point when a mobile terminal moves from a first wireless LAN connected to said one access point to a second wireless LAN connected to said second access point.

7. The communication network as defined in claim 6 wherein said means for transferring transfers said table information directly from said table in said one access point to said table in said second access point.

8. The communication network of claim 6 wherein said means for transferring includes transmitting said table information directly from said mobile terminal to said table in said second access point in response to an indication from said mobile terminal that it requires access to said second access point.

9. In the communications network as defined in claim 5 wherein said at least one access point further includes means for responding to broadcast traffic levels in said wired network to control said level of filtering.

10. In the communications network as defined in claim 1 further including the steps of selecting additional parameters in said table for comparison with parameters received in said message frames.

11. A device for controlling the transmission of messages between at least one wired network and at least one wireless network comprising:

a first interface means for coupling the device to the at least one wired network;

a second interface means for coupling the device to the at least one wireless network; and a third interface means for interconnecting the first interface means and the second interface means, said third interface means including a filtering means for receiving messages from the at least one wired network correlating selected parameters in selected ones of the messages received to parameters stored in said device and forwarding messages to said at least one wireless network if the selected parameters in said selected ones of the messages correspond to selected ones of the parameters stored and forwarding to the at least one wireless network only those messages requiring action from a node on said at least one wireless network.

12. The communications network set forth in claim 10 wherein the additional parameters are a function of traffic on said communications network.

* * * * *